United States Patent
Morita

(10) Patent No.: US 10,148,834 B1
(45) Date of Patent: Dec. 4, 2018

(54) INSERTION MEMBER AND IMAGE READING DEVICE

(71) Applicant: KYOCERA Document Solutions Inc., Osaka (JP)

(72) Inventor: Takuro Morita, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/981,195

(22) Filed: May 16, 2018

(30) Foreign Application Priority Data

May 30, 2017 (JP) ................ 2017-106848

(51) Int. Cl.
*H04N 1/00* (2006.01)
*H04N 1/192* (2006.01)
*B65H 1/04* (2006.01)
*H04N 1/10* (2006.01)

(52) U.S. Cl.
CPC ......... *H04N 1/00588* (2013.01); *B65H 1/04* (2013.01); *H04N 1/00543* (2013.01); *H04N 1/00559* (2013.01); *H04N 1/00809* (2013.01); *H04N 1/1061* (2013.01)

(58) Field of Classification Search
CPC combination set(s) only.
See application file for complete search history.

(56) References Cited

FOREIGN PATENT DOCUMENTS

| JP | H07-219067 A | 8/1995 |
|---|---|---|
| JP | 2005-026932 A | 1/2005 |

*Primary Examiner* — Helen Zong
(74) *Attorney, Agent, or Firm* — IP Business Solutions, LLC

(57) ABSTRACT

An image reading device includes: a housing, a document loading surface, a reading unit, a first through hole, a second through hole, an insertion member, and a first member. The first through hole is provided in a manner such as to be pierced through the housing. The second through hole is provided oppositely to the first through hole in a manner such as to be pierced through the reading unit located at a predefined place. When being inserted in the first through hole and the second through hole, the insertion member stops movement of the reading unit in a horizontal direction and fixes the reading unit in the housing. The first member closes the first through hole and has a shape deforming in accordance with the insertion of the insertion member in the first through hole and the second through hole.

13 Claims, 14 Drawing Sheets

INSERTION MEMBER AND IMAGE READING DEVICE

INCORPORATION BY REFERENCE

This application claims priority to Japanese Patent Application No. 2017-106848 filed on May 30, 2017, the entire contents of which are incorporated by reference herein.

BACKGROUND

This disclosure relates to an insertion member and an image reading device, and more specifically to an image reading device such as a scanner which is included in an image forming apparatus such as a copier.

An image reading device such as a scanner included in a copier or the like includes a reading unit which has a plurality of optical members, such as a light source and a reflection mirror, fitted in the device for reading a document. The reading unit is configured to be movable in a horizontal direction for the purpose of scanning a document loaded on a document loading surface such as platen glass. To achieve accurate reading, the optical members of the reading unit are manufactured with high precision and attached.

However, the optical members of the reading unit may be shifted or deformed by, for example, vibration or shock upon transportation of the image reading device. Moreover, since the reading unit is movable, the reading unit may hit a housing or the like storing the reading unit, leading to a risk of breakage of the reading unit during the transportation of the image reading device. Thus, to avoid a fault or the breakage of the reading unit caused by the transportation, fixation of the reading unit by a fixing member is performed to prevent movement of the reading unit.

Known for the fixation of the reading unit as described above is, for example, a technology, in an image forming apparatus provided with a scanning optical system (reading unit) formed of two movable scanning bodies, including: a first fixation member fixing one of the movable scanning bodies at a body of the image forming apparatus; and a second fixation member fixing another one of the movable scanning member and the first fixation member. Consequently, the breakage of the optical members caused by the oscillation during the transportation, etc. are prevented.

Also known is a structure such that an optical member movable within a frame body is fixed at the frame body with a fixing pin used for temporary fixation.

SUMMARY

As one aspect of this disclosure, a technology obtained by further improving the technology described above will be suggested.

An insertion member according to one aspect of this disclosure is an insertion member applied to a device. The device includes a unit, a first through hole, a second through hole, and a first member. The unit is arranged below a first surface provided at a top part of a housing and is movable in a horizontal direction along the first surface in the housing. The first through hole is provided in a manner such as to be pierced through the housing. The second through hole is provided oppositely to the first through hole in a manner such as to be pierced through the unit located at a predefined place. The first member closes the first through hole and has a deformable shape. When being inserted in the first through hole and the second through hole, the insertion member stops movement of the unit in the horizontal direction and fixes the unit in the housing, and changes the shape of the first member in accordance with the insertion of the insertion member.

An image reading device according to another aspect of this disclosure includes a housing, a document loading surface, a reading unit, a first through hole, a second through hole, and a first member. The document loading surface is provided at a top part of the housing and loads a document thereon. The reading unit is arranged below the document loading surface, is movable in a horizontal direction along the document loading surface in the housing, and optically reads an image of the document loaded on the document loading surface. The first through hole is provided in a manner such as to be pierced through the housing. The second through hole is provided oppositely to the first through hole in a manner such as to be pierced through the reading unit located at a predefined place. When being inserted in the first through hole and the second through hole, the insertion member stops movement of the reading unit in the horizontal direction and fixes the reading unit in the housing. The first member closes the first through hole and has a shape deforming in accordance with the insertion of the insertion member in the first through hole and the second through hole.

DETAILED DESCRIPTION

Figure 1:
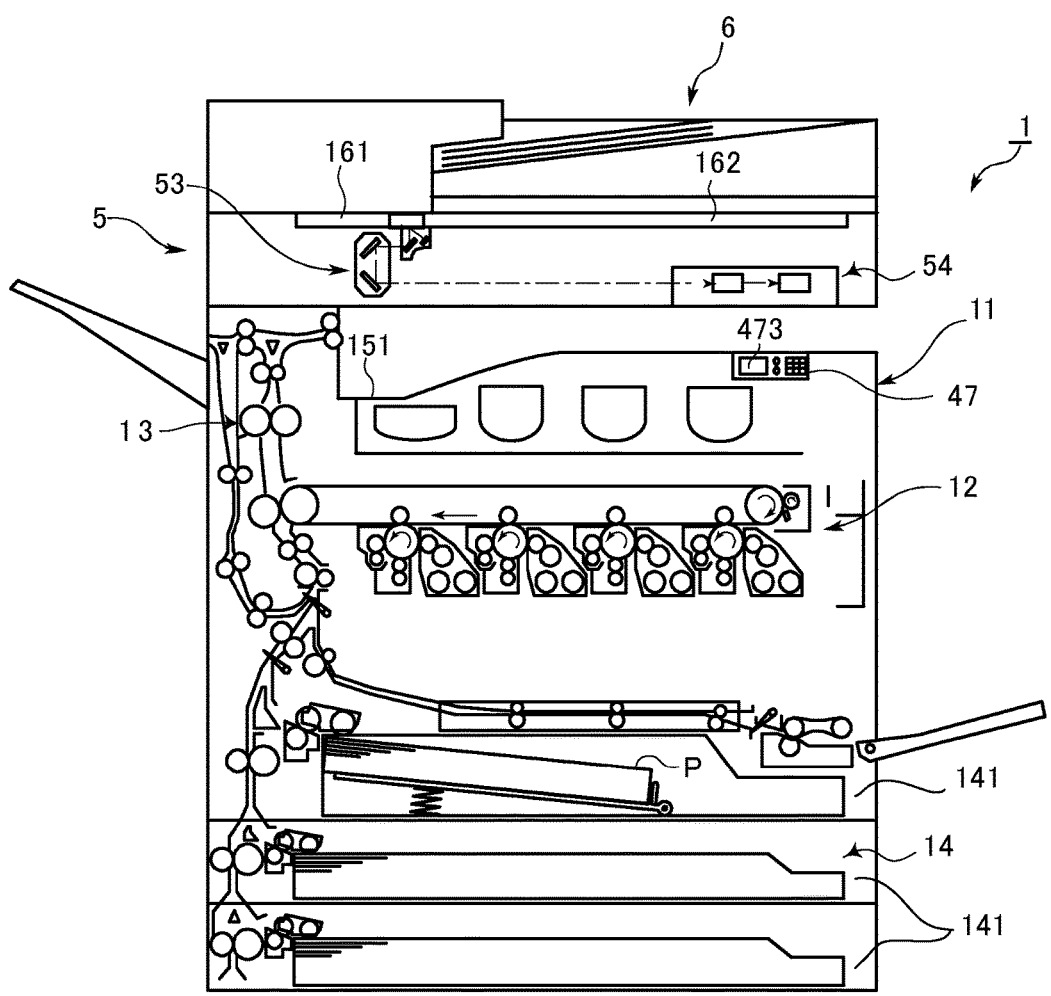
FIG. 1 is a partial sectional elevation view schematically illustrating a structure of an image forming apparatus including an image reading device according to a first embodiment of this disclosure.

Hereinafter, an image reading device according to one embodiment of this disclosure will be described with reference to the drawings. FIG. 1 is a partial sectional elevation view schematically illustrating a structure of an image forming apparatus including the image reading device according to the first embodiment of this disclosure. The image forming apparatus 1 is a multifunction peripheral including a combination of a plurality of functions such as, for example, a copy function, a printer function, a scanner function, and a facsimile function. The image forming apparatus 1 includes, in an apparatus body 11, an operation section 47, a document feed section 6, an image reading device 5, an image formation section 12, a fixing device 13, and a paper feed section 14. Note that the image reading device 5 is one example of a device in the scope of the claims.

The operation section 47 receives, from an operator, instructions such as an image formation operation execution instruction for various types of operation and processing executable by the image forming apparatus 1. The operation section 47 includes a display section 473 which displays, for example, an operation guide to the operator. The display section 473 is a touch panel, and the operator can touch a button or a key displayed on a screen to operate the image forming apparatus 1.

A case where the document reading operation is performed in the image forming apparatus 1 will be described. The image reading device 5 optically reads an image of a document which has been conveyed by the document feed section 6 and which has passed through conveyed-reading platen glass 161 or a document loaded on loaded-reading platen glass 162 to generate image data. The image data generated by the image reading device 5 is saved into, for example, a built-in hard disk drive (HDD) or a network-connected computer. Note that the conveyed-reading platen glass 161 and the loaded-reading platen glass 162 are one example of a first surface and one example of a document loading surface in the scope of the claims.

The image reading device 5 includes: a reading unit 53 which has a light source, a reflection mirror, etc. and which is capable of moving forward and backward in a horizontal direction (to a right and left in the figure); and a charge coupled device (CCD) unit 54 which has a CCD sensor, etc. The image reading device 5 reads an image from a document by irradiating the document by using the light source and receiving reflected light thereof with the CCD sensor. Note that the reading unit 53 is one example of a unit in the scope of the claims.

A case where the image formation operation is performed in the image forming apparatus 1 will be described. Based on the image data generated through the document reading operation, the image data stored in the built-in HDD, the image data received from the network-connected computer, etc., the image formation section 12 forms a toner image on paper P serving as recording paper (a recording medium) fed from the paper feed section 14.

The fixing device 13 fixes the toner image on the paper P through thermal compression. The paper P which has been subjected to fixing processing and on which a color image has already been formed is finally discharged onto a discharge tray 151. The paper feed section 14 includes a plurality of paper feed cassettes 141.

Figure 2:
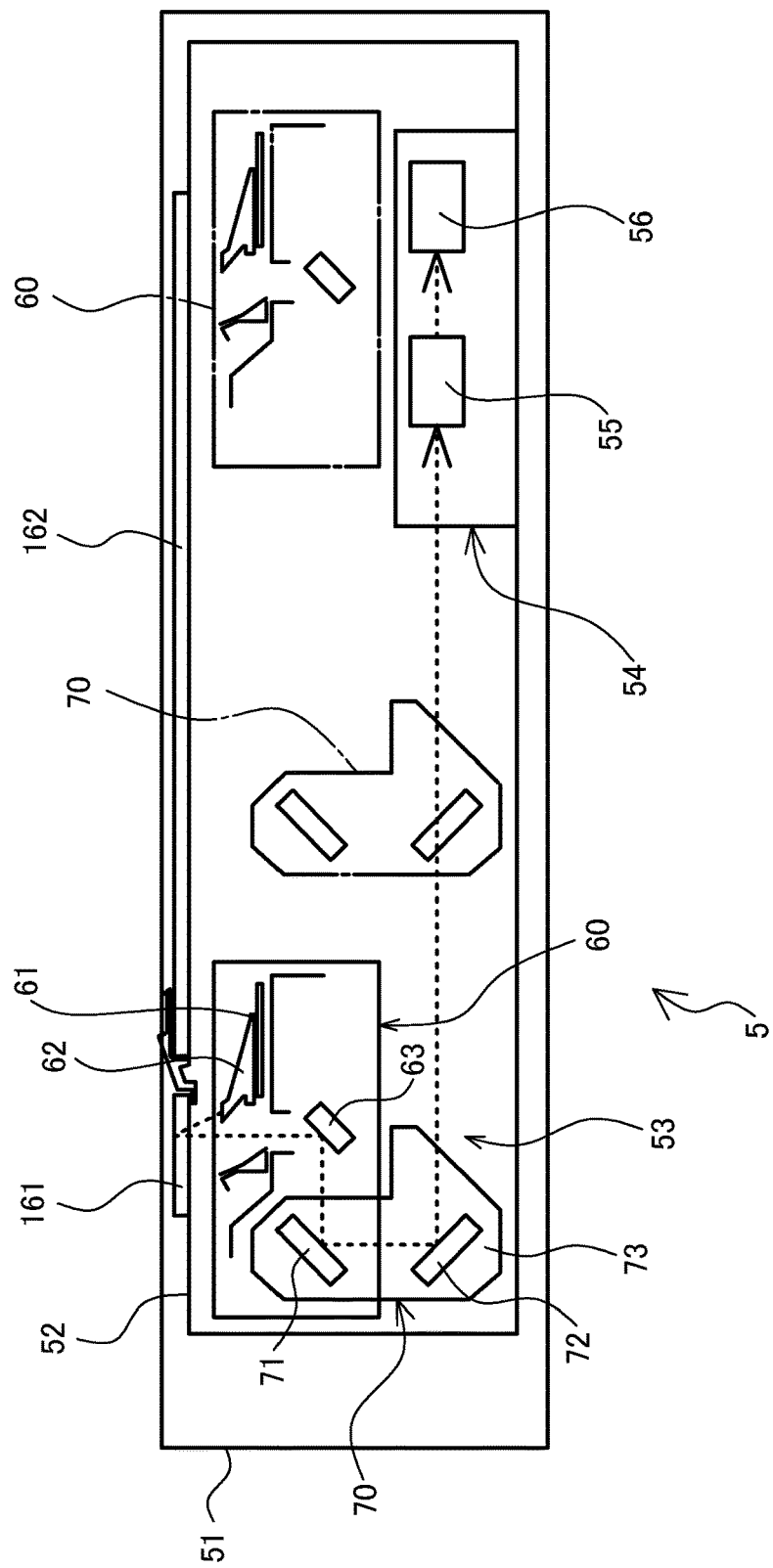
FIG. 2 is a partial sectional elevation view schematically illustrating a structure of the image reading device according to the first embodiment.

FIG. 2 is a partial sectional elevation view schematically illustrating a structure of the image reading device 5. The image reading device 5 includes: a device cover 51 and a housing 52 which is stored in the device cover 51. Provided at a top part of the housing 52 are the conveyed-reading platen glass 161, the loaded-reading platen glass 162, etc. The reading unit 53 and the CCD unit 54 are arranged below the conveyed-reading platen glass 161 and the loaded-reading platen glass 162 and stored in the housing 52.

The reading unit 53 includes a light source unit 60 and a mirror unit 70. The light source unit 60 is provided at a top and the mirror unit 70 is provided at a bottom. The light source unit 60 includes a light source 61, a light guiding section 62, and a first reflection mirror 63. The mirror unit 70 includes a second reflection mirror 71, a third reflection mirror 72, and a support frame 73. The second reflection mirror 71 and the third reflection mirror 72 are supported by the support frame 73.

Light irradiated from the light source 61 is guided to the light guiding section 62 and directed towards the conveyed-reading platen glass 161 or the loaded-reading platen glass 162, hitting the document loaded on the conveyed-reading platen glass 161 or the loaded-reading platen glass 162. Reflected light of the aforementioned light is reflected by the first reflection mirror 63 towards an upstream side (left side in the figure) in a moving direction of the reading unit 53.

On a light path of the aforementioned reflected light, the second reflection mirror 71 is provided, which reflects the light downward. Further on the light path of the aforementioned reflected light, the third reflection mirror 72 is provided, which reflects the light towards a downstream side (a right side in the figure) in the moving direction of the reading unit 53. The light reflected by the third reflection mirror 72 is focused on a lens 55 which forms the CCD unit 54 and is imaged by the CCD sensor 56 which forms the CCD unit 54.

A wire (not illustrated) is fitted to the light source unit 60 and the mirror unit 70. The wire is connected to a winding drum (not illustrated), and rotation of the winding drum causes the light source unit 60 and the mirror unit 70 to move in a horizontal direction (to the right and left in the figure). The light source unit 60 is arranged below the loaded-reading platen glass 162 (the document loading surface), and is movable in the horizontal direction along the loaded-reading platen glass 162 in the housing 52.

The light source unit 60 and the mirror unit 70 are coupled together, so that the light source unit 60 and the mirror unit 70 move cooperatively with each other and the mirror unit 70 moves at a speed half of a speed of the light source unit 60. Note that examples of a rotational driving source of the winding drum include a motor, and rotation of the motor can cause rotation of the winding drum.

Figure 3:
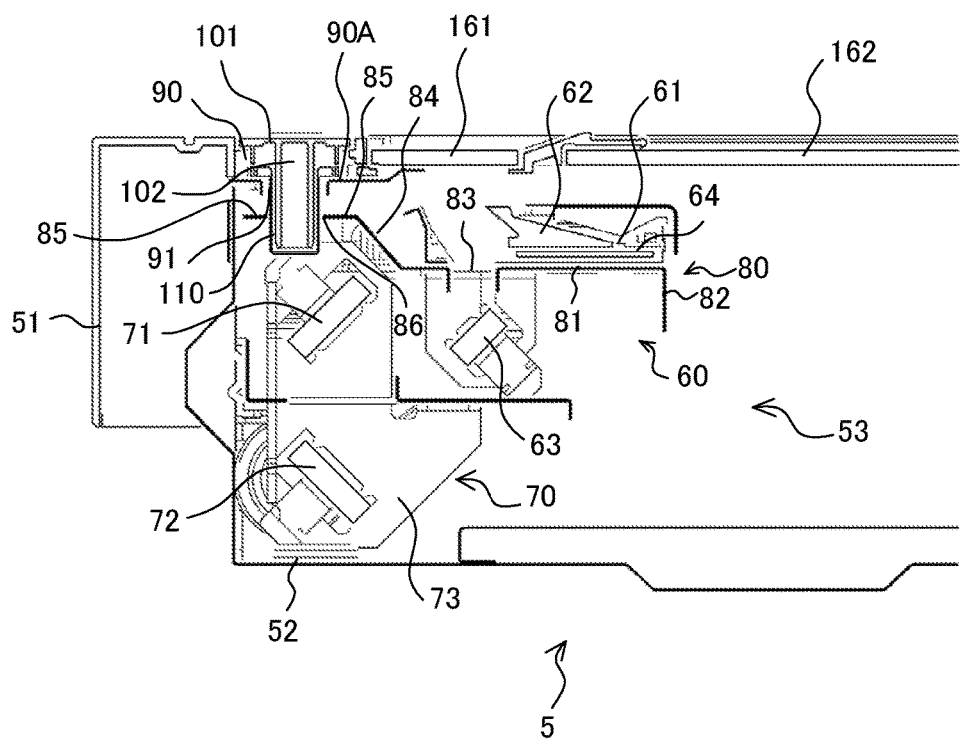
FIG. 3 is a sectional view of the image reading device from a front, illustrating a state in which a reading unit is fixed in a housing.
Figure 4:
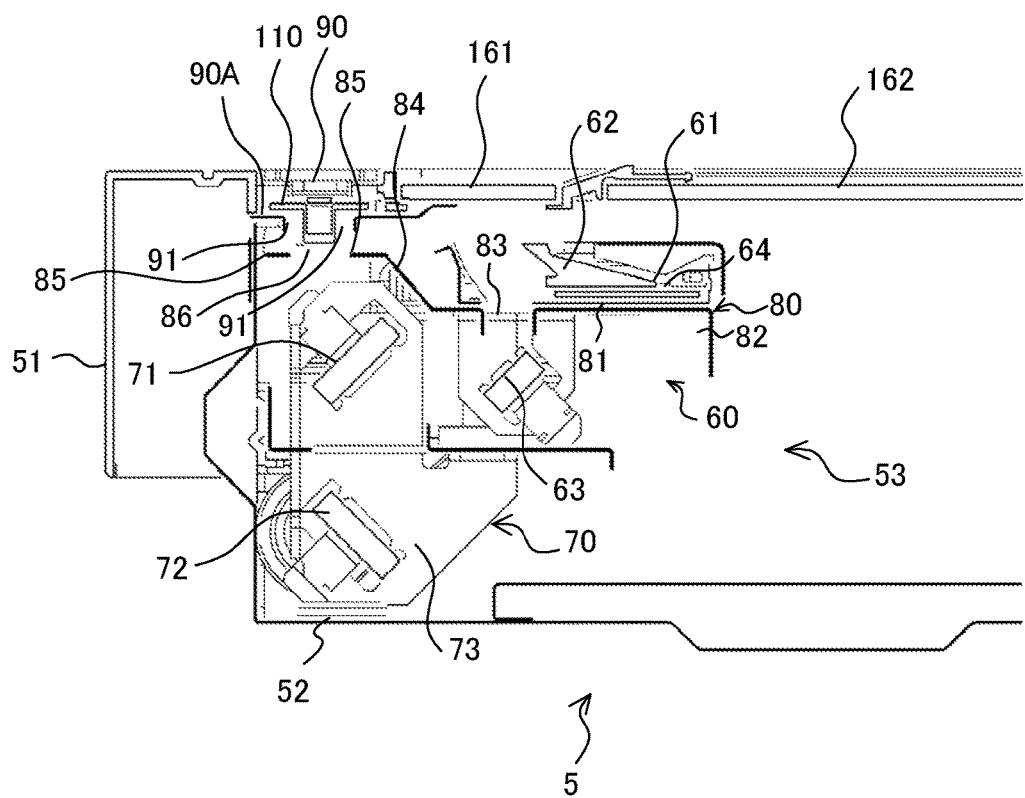
FIG. 4 is a sectional view of the image reading device from the front, illustrating a state in which the fixation of the reading unit is released.

Next, a mechanism for fixing the reading unit 53 will be described with reference to FIGS. 3 and 4. FIG. 3 is a sectional view of the image reading device 5 from a front, illustrating a state in which the reading unit 53 is fixed in the housing 52. FIG. 4 is a sectional view of the image reading device 5 from the front, illustrating a state in which the fixation of the reading unit 53 is released. Note that same components as those of the image reading device 5 illustrated in FIG. 2 are provided with the same numerals and omitted from the description.

The light source unit 60 includes the light source 61; a light source loading substrate 64 which loads the light source 61; the light guiding section 62 which is provided on a top surface of the light source loading substrate 64; the first reflection mirror 63; and a fixing plate 80 which fixes the light source loading substrate 64.

The fixing plate 80 formed by subjecting a metal plate to press processing includes: a support part 81 of a plat plate-like shape which supports the light source loading substrate 64; a side plate part 82 which is formed while bent downward from a right edge part of the support part 81 in the figure and which extends in an anterior-posterior direction (perpendicularly to a paper surface); a recessed part 83 which is formed by recessing a left of the support part 81 across an approximately full length thereof in an anterior-posterior direction; an extension part 84 which is provided in a manner such as to extend obliquely upward and leftward from a left edge part of the recessed part 83; and a flat plate part 85 of a flat plate-like shape which horizontally extends from a left edge part of the extension part 84. The first reflection mirror 63 is provided immediately below the recessed part 83.

Figure 5:
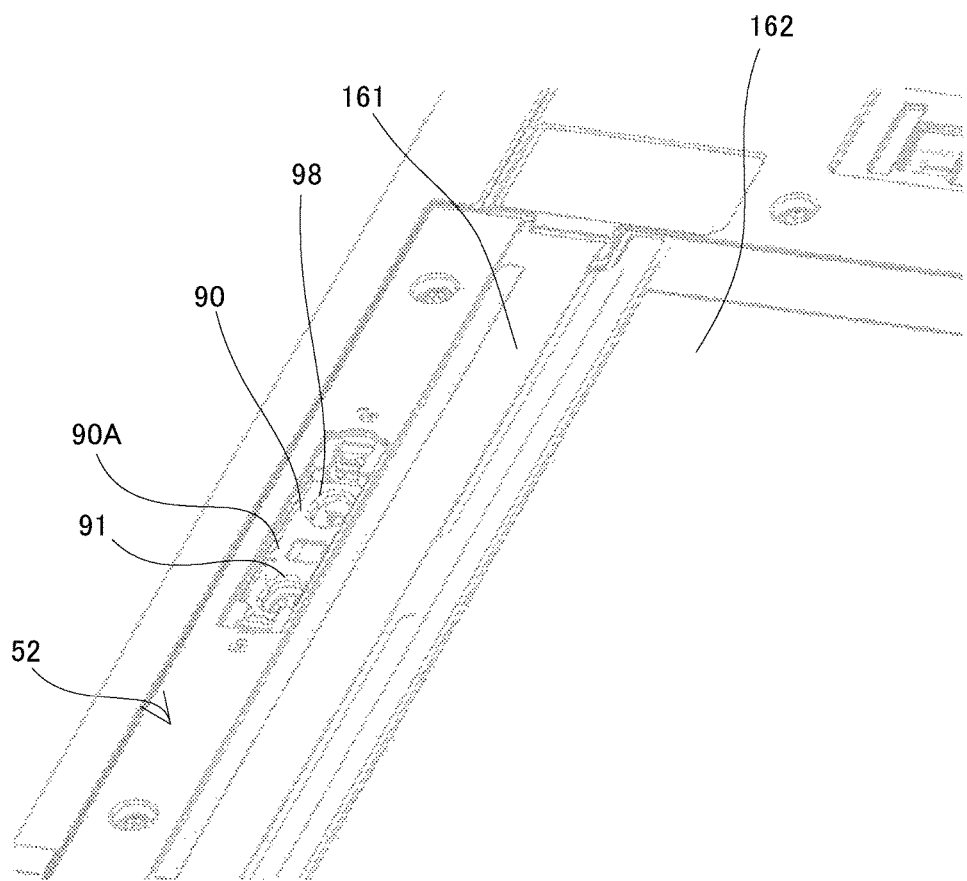
FIG. 5 is a perspective view of a concave part provided in the housing and surrounding parts thereof from a top.

The image reading device 5 includes: a concave part 90 which is provided at a top part of the housing 52 storing the reading unit 53; and a cover part 101 (FIG. 3) for closing the concave part 90. A first through hole 91 is provided in a manner such as to be pierced through a bottom part of the concave part 90. FIG. 5 is a perspective view of the concave part 90 and a housing 52 portion serving as a surrounding part of the concave part 90 from a top. Note that FIG. 5 illustrates the concave part 90 with three through holes formed at a bottom part thereof, and one of the through holes in FIG. 5 is the first through hole 91 in the first embodiment. Provided on a bottom surface 90A of the concave part 90 is an elastic member 110 (FIG. 7), details of which will be described later on.

A second through hole 86 is provided at the flat plate part 85 of the reading unit 53 in a manner such as to be pierced through the flat plate part 85 portion opposing the first through hole 91 when the reading unit 53 is located at a predefined place (a place for fixing the reading unit 53, for example, a home position, and FIGS. 3 and 4 illustrate an example in which the reading unit 53 is located at the home position as the predefined place).

An insertion member 102 (FIG. 3) is inserted in the first through hole 91 and the second through hole 86 to thereby fix the light source unit 60 (the reading unit 53) in the housing 52. The insertion member 102 is also provided in a manner such as to project on a back surface of the cover part 101 at a position opposing the first through hole 91 in a state in which the cover part 101 closes the concave part 90.

Figure 6:
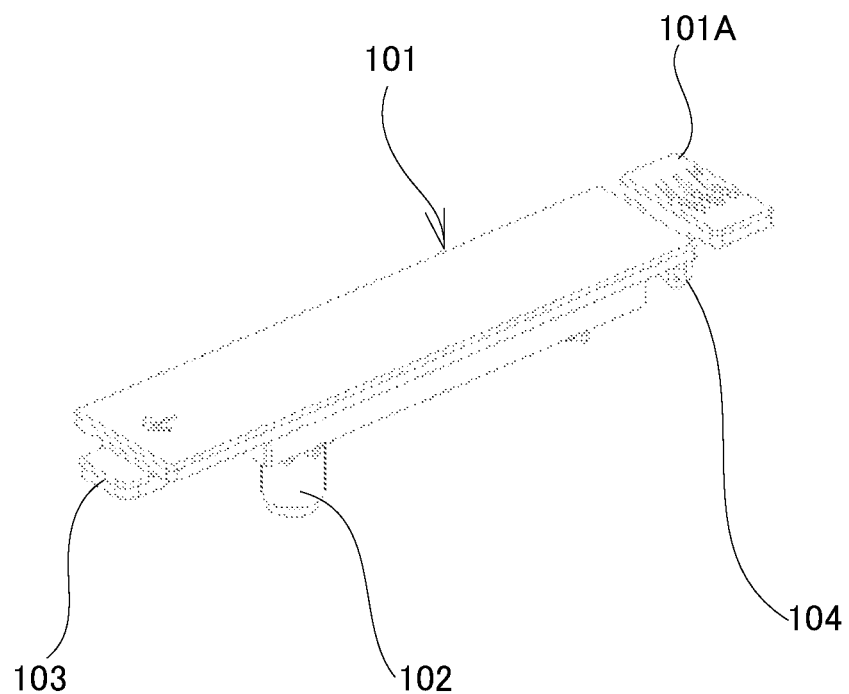
FIG. 6 is a perspective view illustrating a cover closing the concave part.

FIG. 6 is a perspective view illustrating the cover part 101. Detailed configuration of the cover part 101 will be described later on. The insertion member 102 fixes the light source unit 60, but does not directly fix the mirror unit 70. This is because the light source unit 60 and the mirror unit 70 are coupled together and the light source unit 60 and the mirror unit 70 are moved cooperatively by one wire, so that even without fixing the mirror unit 70, the mirror unit 70 does not greatly move and the reading unit 53 is fixed as a whole.

To achieve more reliable fixation of the mirror unit 70, for example, the support frame 73 forming the mirror unit 70 may be extended to a position opposing the first through hole 91 and the second through hole 86, then a through hole may be formed at this position in the support frame 73, and the insertion member 102 may also be inserted in this hole.

The elastic member 110 which closes the first through hole 91 is fitted onto the bottom surface 90A of the concave part 90. Moreover, the elastic body 110 is extendable in a direction in which the insertion member 102 is inserted (a direction in which the first through hole 91 and the second through hole 86 are aligned, and a vertical direction in FIG. 6). As illustrated in FIG. 4, the elastic body 110 does not reach the flat plate part 85 (reading unit 53) and does not enter the reading unit 53 before the insertion member 102 is inserted.

Upon the insertion of the insertion member 102 in the first through hole 91 and the second through hole 86 in the aforementioned insertion direction, as illustrated in FIG. 3, the elastic body 110 is deformed along a shape of the insertion member 102 into a shape which enters the second through hole 86 of the reading unit 53. At this point, a tip part of the insertion member 102 is located at a more lower position than the flat plate part 85, thereby entering the reading unit 53. The elastic body 110 is formed in manner such that, upon removal of the insertion member 102 from the first through hole 91 and the second through hole 86, the elastic body 110 is restored into a state before the insertion, as illustrated in FIG. 4.

Figure 7:
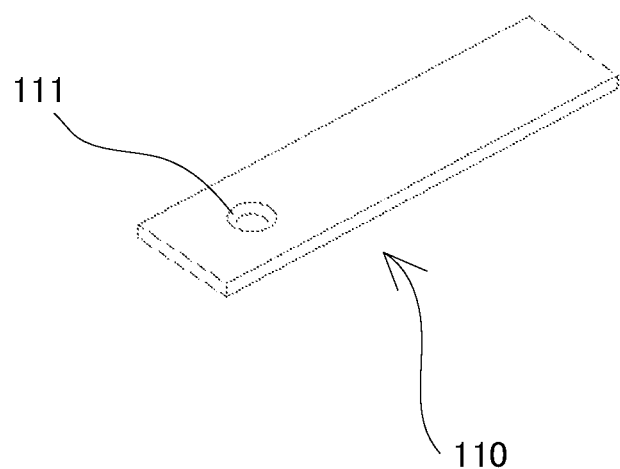
FIG. 7 is a perspective view illustrating an elastic member provided on a bottom surface of the concave part.

FIG. 7 is a perspective view illustrating the elastic body 110. While fitted onto the bottom surface 90A of the concave part 90, the elastic body 110 has, at a position opposing the first through hole 91, a projection part 111 which is projected in the insertion direction of the insertion member 102. The projection part 111 permits easy visual check of the position where the insertion member 102 should be inserted. The projection part 111 is formed to have a diameter becoming increasingly smaller towards a tip part of the projection part 111 than a base part of the projection part 111. Note that the diameter of the tip part of the projection part 111 is larger than or at least equal to a diameter of the tip part of the insertion member 102. Consequently, the tip part of the insertion member 102 can smoothly be guided to the tip part of the projection part 111 upon insertion of the insertion member 102 in the first through hole 91 and the second through hole 86.

Figure 8A:
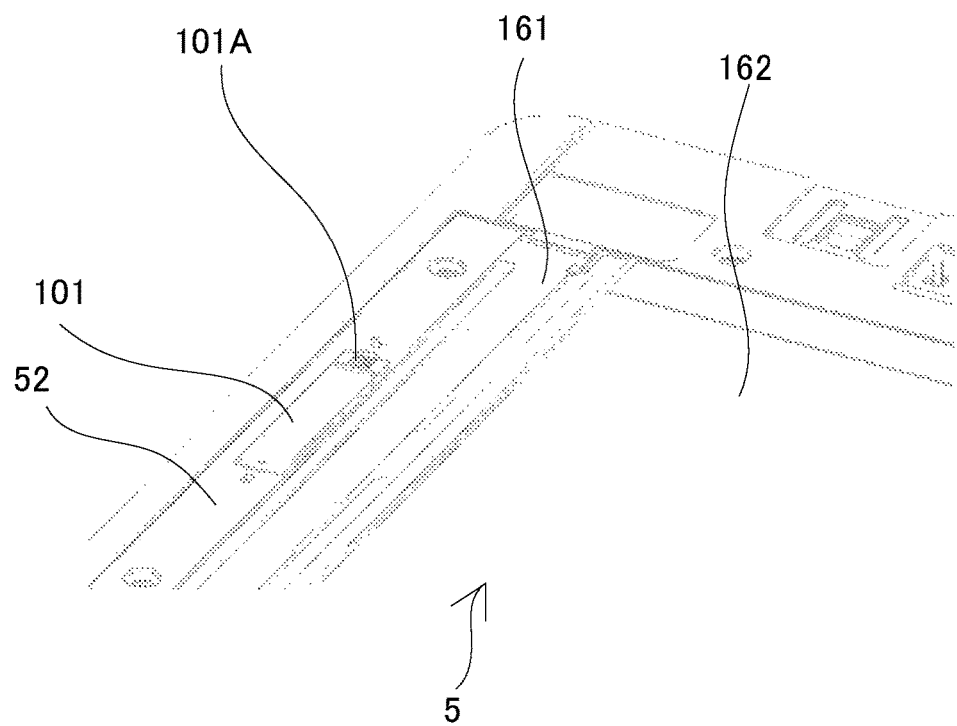
FIG. 8A is a perspective view illustrating a state in which a cover body is fitted in the concave part of the housing.
Figure 8B:
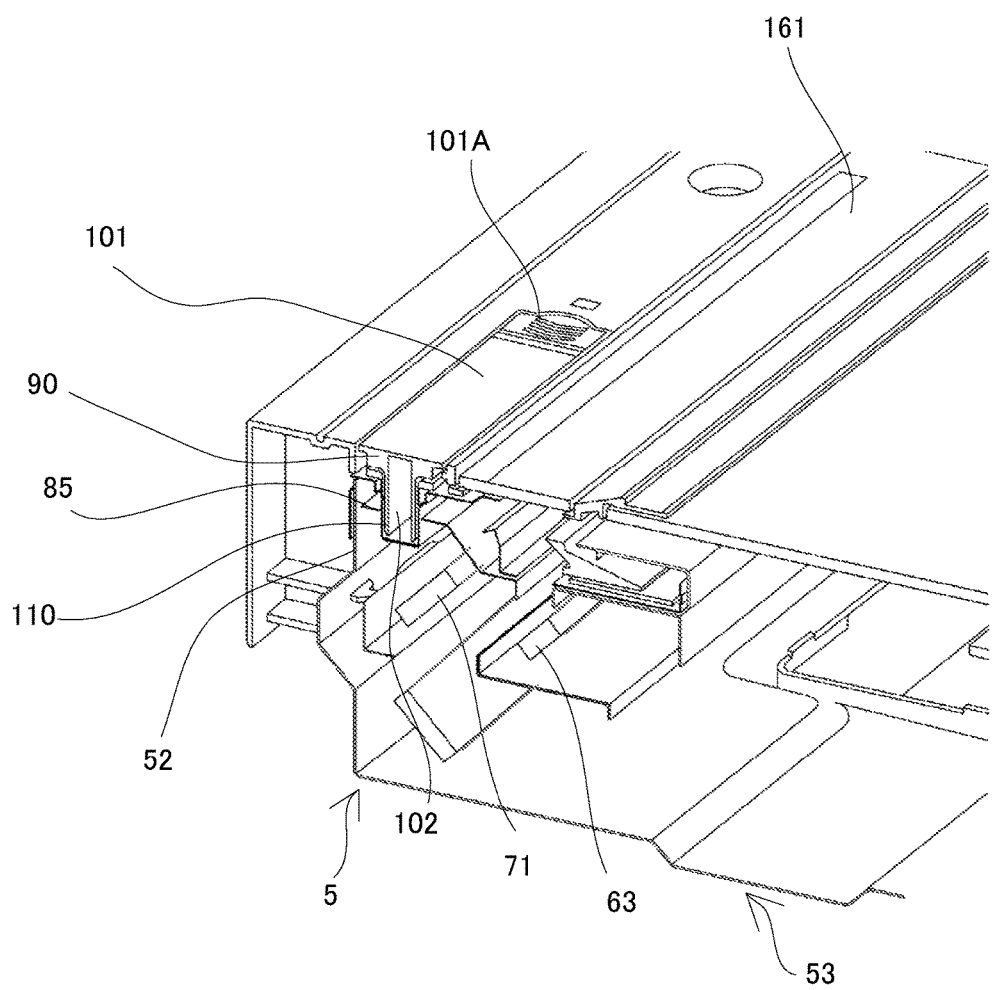
FIG. 8B is a partially broken perspective view of the image reading device from a front top, illustrating a state in which the reading unit is fixed in the housing.

FIG. 8A is a perspective view illustrating a state in which the cover part 101 is fitted in the concave part 90 of the housing 52. FIG. 8B is a perspective view of the image reading device 5 partially broken from a front top, illustrating a state in which the reading unit 53 is fixed in the housing 52.

Figure 9A:
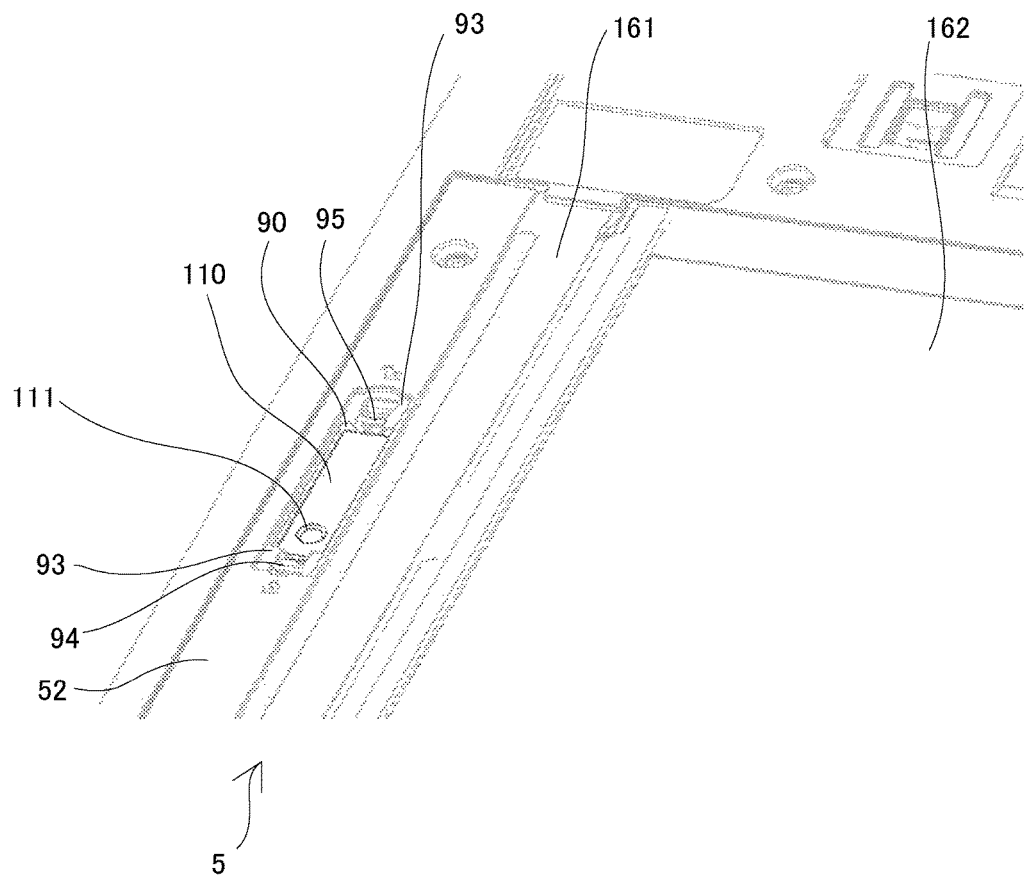
FIG. 9A is a partial perspective view of the image reading device from the front top, illustrating a state in which the cover body is removed from the housing and the fixation of the reading unit is released.
Figure 9B:
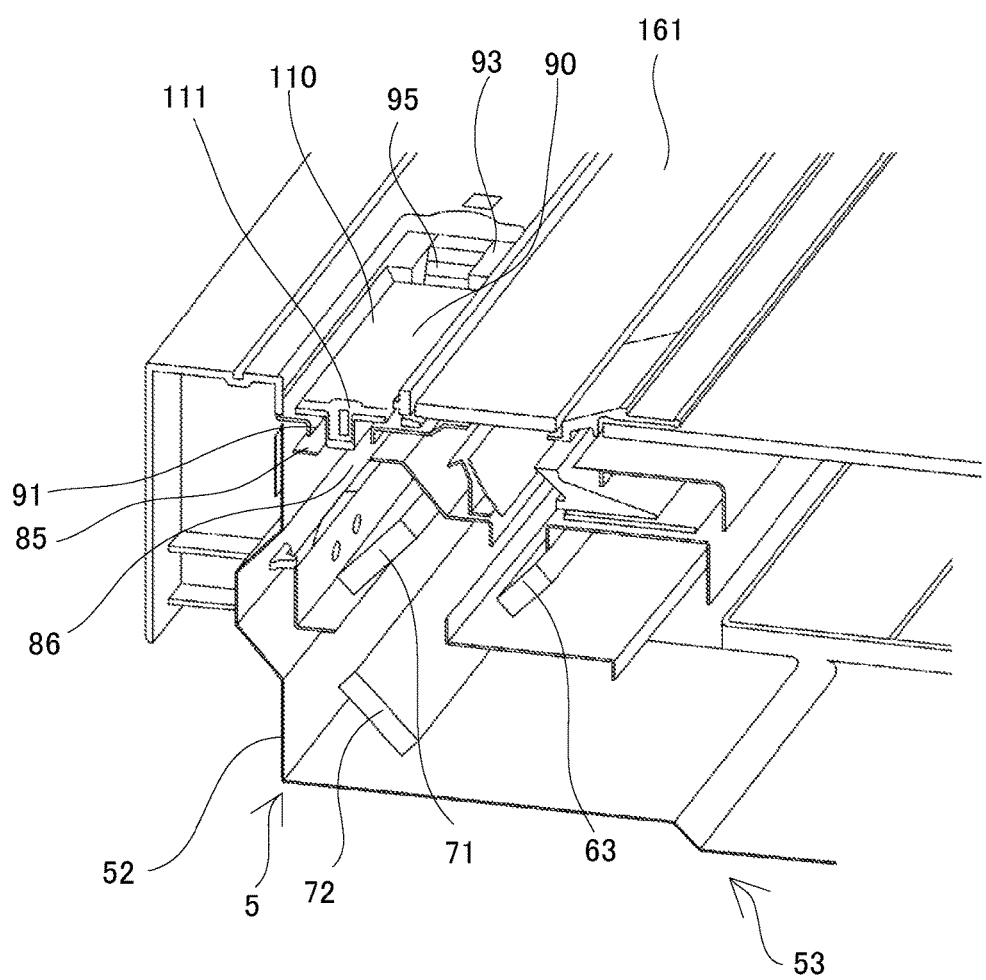
FIG. 9B is a partially broken perspective view of the image reading device from the front top, illustrating a state in which the cover body is removed from the housing and the fixation of the reading unit is released.

FIG. 9A is a perspective view of part of the image reading device 5 from the front top, illustrating a state in which the cover part 101 is removed from the housing 52 and the fixation the fixation of the reading unit 53 is released. FIG. 9B is a perspective view pf the image reading device 5 partially broken from the front top, illustrating a state in which the cover part 101 is removed from the housing 52 and the fixation of the reading unit 53 is released.

Formed around the concave part 90 provided at the top part of the housing 52 is a support p art 93 which supports the cover part 101. A hook locking part 103 (FIG. 6) is provided on a lower surface of one end part of the cover part 101, and engages with a locking part 94 (FIG. 9A) provided at one end part of the support part 93. An operation part 101A (FIG. 6) is integrally formed at another end part of the cover part 101. An elastically displaced part 104 (FIG. 6) of a U-shape is provided on a lower surface of the another end part of the cover part 101, and engages with an engaging concave part 95 (FIGS. 9A and 9B) provided at another end part of the support part 93.

A length of the elastically displaced part 104 in a longitudinal direction is substantially equal to a length of the engaging concave part 95 in a longitudinal direction. The elastically displaced part 104 is thinly formed and elastically deformable in a direction orthogonal to the longitudinal direction. Thus, strongly pressing the operation part 101A towards an inside of the housing 52 upon the fitting of the cover part 101 in the concave part 90 permits elastic displacement of the elastically displaced part 104 along the support part 93.

Consequently, engaging the hook locking part 103 of the cover part 101 with the locking part 94 from the states illustrated in FIGS. 9A and 9B and then closing the concave part 90 with the cover part 101 leads to engagement between the elastically displaced part 104 and the engaging concave part 95, which permits the cover part 101 to be fitted in the housing 52, causing a state in which the concave part 90 is closed with the cover part 101. That is, the cover part 101 turns into a state illustrated in FIG. 8A. At this point, the insertion member 102 (FIG. 3) is inserted in the first through hole 91 and the second through hole 86, stopping movement of the light source unit 60 (reading unit 53) and fixing the reading unit 53 in the housing 52.

Moreover, operating the operation part 101A from the state illustrated in FIG. 8A to release the engagement between the elastically displaced part 104 and the engaging concave part 95 and then pulling up the cover part 101 with an engagement portion between the hook locking part 103 and the locking part 94 serving as a support point releases the engagement between the hook locking part 103 and the locking part 94, which therefore permits removal of the cover part 101 from the housing 52.

Figure 10:
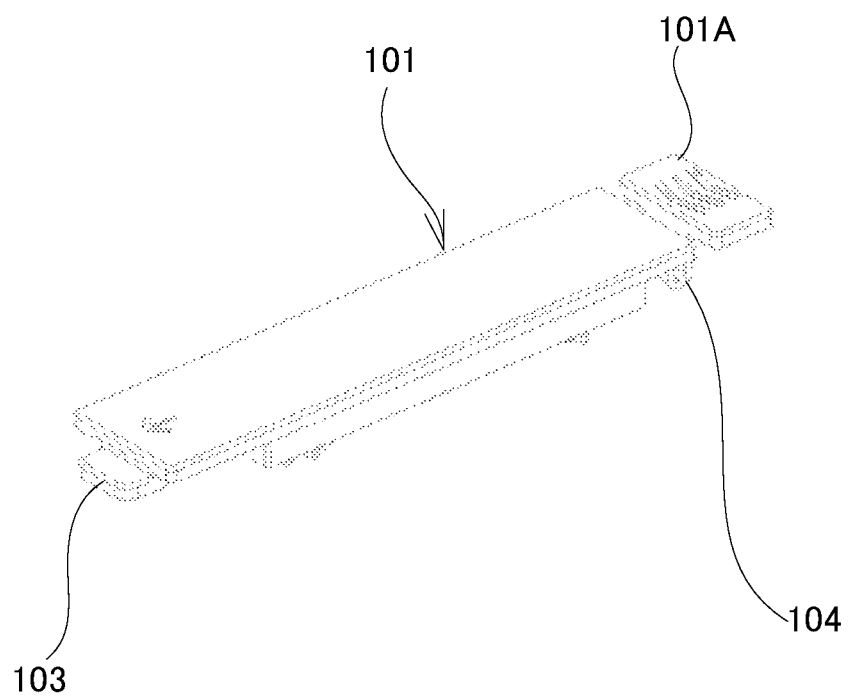
FIG. 10 is a perspective view illustrating a cover not having an insertion member.

Specifically, the cover part 101 having the insertion member 102 is removed from the housing 52, turning into the state illustrated in FIG. 9A. At this point, the insertion member 102 is not inserted in the first through hole 91 and the second through hole 86, and thus the reading unit 53 is not fixed in the housing 52, which does not prevent horizontal movement of the reading unit 53. Note that after the removal of the cover part 101 from the housing 52, a cover body 201 without the insertion member 102 may be fitted in the housing 52 as illustrated in an example of FIG. 10.

In the technology described in the BACKGROUND, a fixation member is inserted in an opening part formed in a manner such as to be pierced through an apparatus body of an image forming apparatus and through a moving scanning body to thereby fix the moving scanning body at the apparatus body of the image forming apparatus, thus exposing the opening part after removal of the fixation member, which leads to a risk that a foreign substance such as dust enter the apparatus body from the opening part and a read image is thereby influenced. Moreover, in a technology of fixing an optical member with a fixing pin, the same problem also arises after removal of the fixing pin. Moreover, an end user (for example, a usual consumer) may perform operation of releasing the fixation of the reading unit, and thus complication of this operation is not preferable.

In the first embodiment, the removal of the cover part 101 from the housing 52 permits the fixation of the reading unit 53 to be released with simple operation of removing the insertion member 102. Moreover, the first through hole 91 provided for inserting the insertion member 102 therein is continuously closed with the elastic body 110 in both a state in which the reading unit 53 is fixed and a state in which the fixation is released, which can therefore prevent entrance of the foreign substance such as dust from the first through hole 91 into the housing 52 storing the reading unit 53. Therefore, it is possible to prevent the entrance of the foreign substance such as dust into the housing 52 without complicating the operation of releasing the fixation of the reading unit 53.

The first embodiment has been described above, referring to a case where another cover body 201, different from the cover part 101, is fitted in the housing 52 after the cover part 101 is removed from the housing 52 to release the fixation of the reading unit 53. In a second embodiment, instead of using the another cover body 201, with the cover part 101 rotated, the insertion member 102 may be inserted in another through hole 98 illustrated in FIG. 5 while the insertion member 102 is not inserted in the first through hole 91, and the cover part 101 may be fitted in the housing 52.

Figure 11:
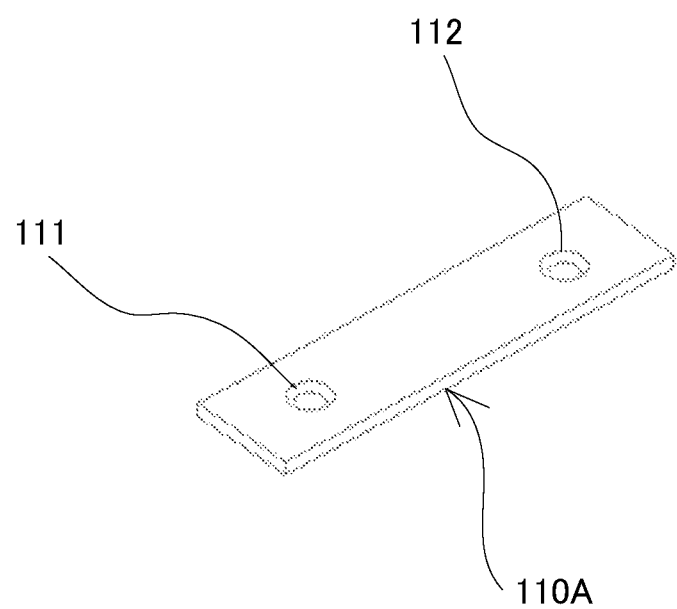
FIG. 11 is a perspective view illustrating an elastic member in an image reading device according to a second embodiment.

FIG. 11 is a perspective view illustrating an elastic member according to the second embodiment. The elastic member 110A has, at a position opposing the another through hole 98 other than the position opposing the first through hole 91, a projection part 112 which is projected in the insertion direction of the insertion member 102. With the elastic member 110A according to the second embodiment, it is possible to close both the first through hole 91 and the another through hole 98 upon fitting of the elastic member 110A.

Figure 12A:
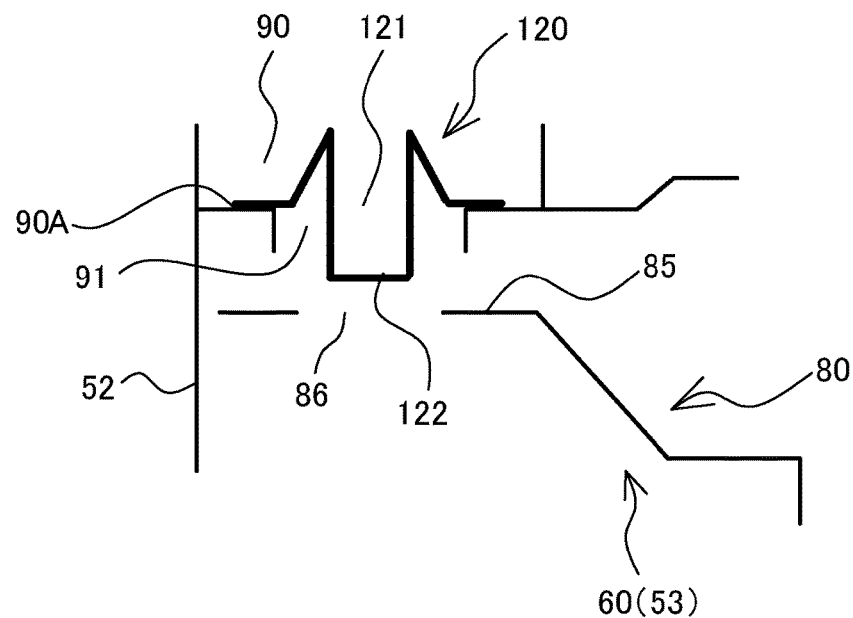
FIG. 12A is a sectional elevation view schematically illustrating a concave part and surrounding parts thereof in an image reading device according to a third embodiment, in a state in which the fixation of the reading unit is released.
Figure 12B:
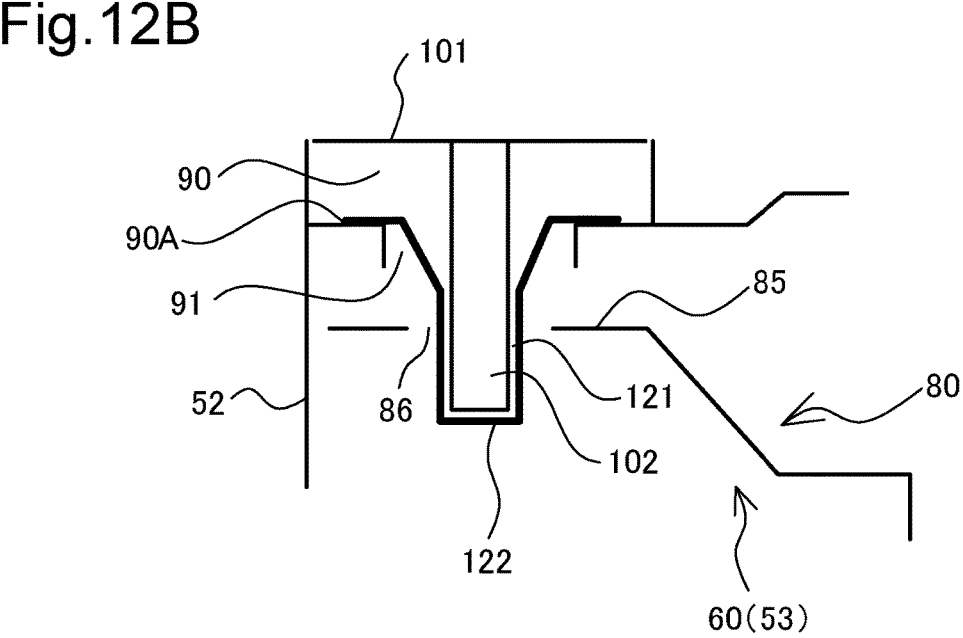
FIG. 12B is a sectional elevation view schematically illustrating the concave part and the surrounding parts thereof in the image reading device according to the third embodiment, in a state in which the reading unit is fixed.

FIGS. 12A and 12B are elevation sectional views schematically illustrating a concave part 90 provided at a top part of a housing 52 and surrounding parts thereof in an image reading device 5 according to the third embodiment. FIG. 12A illustrates a state in which the fixation of the reading unit 53 is released with the insertion member 102 not inserted. FIG. 12B illustrates a state in which the reading unit 53 is fixed with the insertion member 102 inserted.

In the third embodiment, instead of the elastic body 110, a deforming member 120 capable of plastic deformation is provided on the bottom surface 90A of the concave part 90. The third embodiment differs from the first embodiment in this point. The deforming member 120 is formed with a hollow space for inserting the insertion member 102 therein with one side having a concave shape entering the first through hole 91 to receive the insertion member 102 while projecting from the first through hole 91 at a position of the first through hole 91 and with another side closing the first through hole 91. The deforming member 120 prevents entrance of foreign substances such as dust from the first through hole 91 into the housing 52 in a state in which the insertion member 102 is not inserted in the first through hole 91. Note that the elastic body 110 and the deforming member 120 are each one example of a first member in the scope of the claims.

Upon insertion of the insertion member 102 in a hollow space 121, the deforming member 120 is deformed in accordance with movement in the insertion direction of the insertion member 102 described above, as illustrated in FIG. 12B. At this point, following the movement of the insertion member 102 in the insertion direction, a closing part 122 enters the light source unit 60 (reading unit 53). Moreover, the deforming member 120 is formed in a manner such that, upon removal of the insertion member 102 from the hollow space 121, the closing part 122 hops out of the housing 52 and the deforming member 120 is restored into the state illustrated in FIG. 12A. Consequently, the same effects as those of the first embodiment can also be exerted in the third embodiment.

Note that this disclosure is not limited to the embodiments and configuration described above, and various modifications thereto are permitted. Moreover, in the embodiments above, a multifunction peripheral has been described as one embodiment of an image reading device according to this disclosure, but it is just one example and it may be any other image reading device having, for example, a copy function, a facsimile function, a scanner function, etc.

Moreover, the configuration and the processing indicated in the embodiments described above with reference to FIGS. 1 to 12 are just one embodiment of this disclosure, and this disclosure is not limited to this configuration and processing.

While the present disclosure has been described in detail with reference to the embodiments thereof, it would be apparent to those skilled in the art the various changes and modifications may be made therein within the scope defined by the appended claims.

What is claimed is:

1. An insertion member being applied to a device, the device comprises:
   a unit being arranged below a first surface provided at a top part of a housing and being movable in a horizontal direction along the first surface in the housing;
   a first through hole being provided in a manner such as to be pierced through the housing;
   a second through hole being provided oppositely to the first through hole in a manner such as to be pierced through the unit located at a predefined place; and
   a first member closing the first through hole and having a deformable shape,
   wherein when being inserted in the first through hole and the second through hole, the insertion member stops movement of the unit in the horizontal direction and fixes the unit in the housing, and changes the shape of the first member in accordance with the insertion of the insertion member.

2. The insertion member according to claim 1, wherein the first surface is a document loading surface on which a document is loaded,
   the unit is a reading unit optically reading an image of the document loaded on the document loading surface, and
   the device is an image reading device.

3. The insertion member according to claim 1, wherein the first member is an elastic member closing the first through hole and being extendable,
   as a result of the insertion of the insertion member in the first through hole and the second through hole, the elastic member is extended in an insertion direction of the insertion member,
   the elastic member is shaped in a manner such as not to enter the second through hole of the unit before the insertion of the insertion member,
   upon the insertion of the insertion member in the insertion direction, the elastic member is deformed along a shape of the insertion member into a shape entering the second through hole of the unit, and
   upon removal of the insertion member from the first through hole and the second through hole, the elastic member is restored into the shape, before the insertion, not entering the second through hole.

4. An image reading device comprising:
   a housing;
   a document loading surface being provided at a top part of the housing and loading a document thereon;
   a reading unit being arranged below the document loading surface, being movable in a horizontal direction along the document loading surface in the housing, and optically reading an image of the document loaded on the document loading surface;
   a first through hole being provided in a manner such as to be pierced through the housing;
   a second through hole being provided oppositely to the first through hole in a manner such as to be pierced through the reading unit located at a predefined place;
   an insertion member stopping movement of the reading unit in the horizontal direction and fixing the reading unit in the housing, when being inserted in the first through hole and the second through hole; and
   a first member closing the first through hole and having a shape deforming in accordance with the insertion of the insertion member in the first through hole and the second through hole.

5. The image reading device according to claim 4, wherein
   an elastic member closing the first through hole and being extendable in an insertion direction of the insertion member is provided as the first member, and
   the elastic member has a shape not entering the second through hole of the reading unit before the insertion of the insertion member, upon the insertion of the insertion member in the insertion direction, the elastic member is deformed along a shape of the insertion member into a shape entering the second through hole of the reading unit, and upon removal of the insertion member from the first through hole and the second through hole, the elastic member is restored into the shape, before the insertion, not entering the second through hole.

6. The image reading device according to claim 5, wherein
   the elastic member has, at a position opposing the first through hole, a projection part projected in the insertion direction of the insertion member.

7. The image reading device according to claim 6, wherein
   the projection part has a shape of a diameter becoming increasingly smaller towards a tip part of the projection part than a base part of the projection part.

8. The image reading device according to claim 5, further comprising:
   a concave part being provided in the housing; and a cover body for closing the concave part, wherein
   the first through hole is provided in a manner such as to be pierced through a bottom part of the concave part,
   the elastic member is provided at a position of the first through hole on a bottom surface of the concave part, and
   the insertion member is provided in a manner such as to project at a position opposing the first through hole on a back surface of the cover body closing the concave part.

9. The image reading device according to claim 8, further comprising:
   another through hole, different from the first through hole, at the bottom part of the concave part, wherein
   in a state in which the insertion member is inserted in the another through hole with the cover body rotated, the cover body can be fitted in the housing.

10. The image reading device according to claim 4, wherein
    the document loading surface is at least one of conveyed reading platen glass through which the document passes while conveyed and loaded reading platen glass for loading the document.

11. The image reading device according to claim 4, wherein
    the reading unit includes a flat plate part through which the second through hole is provided in a manner such as to be pierced oppositely to the first through hole when the reading unit is located at the predefined place.

12. The image reading device according to claim 8, further comprising
   another cover body for closing the concave part, wherein the another cover body does not have the insertion member.

13. The image reading device according to claim 4, comprising
   a deforming member capable of plastic deformation with one side having a concave shape projecting from the first through hole at a position of the first through hole and also entering the first through hole to receive the insertion member and with another side being formed with a hollow space for inserting the insertion member therein to close the first through hole is provided as the first member, wherein
   the deforming member is formed to be deformed in accordance with movement of the insertion member upon the insertion of the insertion member in the first through hole and the second through hole, in a manner such that, when the insertion member is inserted in the hollow space upon the insertion, a closed portion is deformed into a shape entering the reading unit, and upon removal of the insertion member from the hollow space as a result of removing the insertion member from the first through hole and the second through hole, the closed portion hops out of the housing.

\* \* \* \* \*